INVENTOR
FRANCIS D. MC LEOD, JR.
BY Bernard Olcott
ATTORNEY

United States Patent Office 3,430,625
Patented Mar. 4, 1969

3,430,625
ULTRASONIC FLOWMETER FOR MEASURING
BLOOD FLOW
Francis D. McLeod, Jr., Scotia, N.Y., assignor to Mennen-Greatbatch Electronics, Inc., Clarence, N.Y., a corporation of New York
Filed Oct. 23, 1965, Ser. No. 503,018
U.S. Cl. 128—2.05                                      6 Claims
Int. Cl. A61b 5/02; G01f 1/00

ABSTRACT OF THE DISCLOSURE

This invention includes process and apparatus for measuring the velocity of fluids in a conduit, especially the velocity of blood in a remote point of an animal or human circulatory system. After an incision is made at a convenient accessible location in a conduit or blood vessel, a pair of transducers are moved from such point of incision and is connected to an ultrasonic transmitter vessel to a desired location. A cable connected to the transducers leaves the conduit or blood vessel at the point of incision and is connected to an ultrasonic transmitter and to Doppler measuring means. The difference in frequency between the outwardly radiating wave from one of the transducers and the frequency of the wave reflected back by the particulate matter in the fluid or the blood as detected by the other transducer determines the fluid or blood flow rate by the Doppler principle.

---

This invention relates to improved methods and apparatus for measuring the velocity of fluids in a conduit or blood vessel and more particularly to an improved electronic flowmeter for measuring the flow of liquids containing particulate matter, such as blood or sea water, capable of reflecting alternating waves, such as ultrasonic waves, in a back-scattering mode.

An object of the invention is to measure the flow of liquids at a selected location in a pipe or conduit which may be remote and inaccessible.

Another object of the invention is to measure the flow of blood at a selected location in a patient's, man or animal, circulatory system which cannot be conveniently exposed.

Still another object of the invention is to measure the flow of blood at a selected location in a blood vessel which is remote and inaccessible by making an incision in another blood vessel which is conveniently accessible.

As used throughout this specification and in the claims appended hereto, the term "remote location" is intended to mean beyond a turn or bend in a conduit, pipe or blood vessel with reference to the point of incision therein. Hence, with reference to a particular blood vessel, the heart is remotely located from an incision in the neck, arm or leg.

Two methods of measuring blood velocity have been prominent in the prior art. Both utilize lumen type probes and both require exposing the artery or vein at the very location, as distinguished from a remote location, where the blood velocity is required and sufficiently to accept the probe. Such insult to the vessel may easily produce local trauma which can seriously disturb the measurement. One method requires exposing the blood vessel and placing a strong electromagnetic field, usually 60 c.p.s. or 400 c.p.s. thereacross, and measuring the voltage induced across the transverse conducting columns of blood as they cut the electromagnetic field by their flow. A second method requires exposing the blood vessel and utilizes two ultrasonic transducers placed upstream and downstream of the velocity measurement station. In such method, ultrasonic pulses are sent alternately upstream and downstream between them and the two transit times are compared. Differences in transit times are then directly related to the flow velocity of the media. A third method, which has yet seen little use, uses the Doppler principle in a single transducer but also has a lumen configuration requiring exposure of the vessel at the location where the blood velocity is required.

According to a broad interpretation of the invention there is provided a method of measuring velocity of a fluid at a selected location in a conduit system which comprises the steps of: opening the conduit at a convenient location remote from the selected fluid velocity measuring location, inserting a pair of juxtapositioned transducers in the opening of the conduit, moving the juxtapositioned pair of transducers longitudinally inside the conduit to a velocity measuring location, radiating a wave from one of the transducers along the conduit, receiving a wave on the other transducer as reflected from the particulate matter in the fluid and measuring the difference in velocity of the radiating wave and the reflected wave.

Also, according to a broad interpretation of the invention there is provided a flowmeter which comprises a pair of juxtapositioned transducers dimensioned to be insertable into and moved along a conduit to a selected remote location in a fluid conveying system, means coupling an alternating voltage to one of the transducers and means coupled to both of the transducers for measuring the difference between the frequency of the radiated wave from one of the transducers and the frequency of the reflected frequency received by the other transducer.

Other objects and features of the present invention will be set forth or apparent in the following description and claims and illustrated in the accompanying drawings, which disclose by way of example and not by way of limitation, in a limited number of embodiments, the principle of the invention and structural implementations of the inventive concept.

In the drawings, in which like reference numbers designate like components in the several views.

Figure 1:
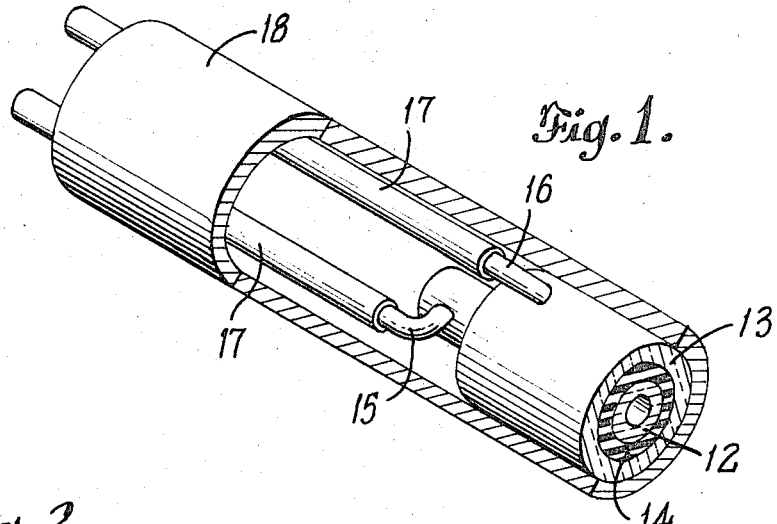
FIG. 1 is an elevation view, partly in cross section, of one embodiment of a catheter type probe according to the invention.

As shown in FIG. 1, a velocity measuring probe comprises a pair of ultrasonic transducers having an inner hollow cylinder 12 of a piezoelectric crystal, such as barium titinate, and an outer hollow cylinder 13 of a piezoelectric crystal material similar to 12. Cylinders 12 and 13 are maintained in concentric relationship by an insulator 14 such as an insulating "epoxy." Preferably, the pair of transducers are dimensioned for transmission and reception of ultrasonic waves of, say, 4.5 mc. An example of the dimensions of such barium titinate crystals are: Inner cylinder 12 dia. 0.040", length, 0.250", wall, 0.010"; outer cylinder 13, dia. 0.080", length 0.250", wall 0.010".

Such dimensions permit the pair of transducers 12, 13 to be enveloped in a nonreactive and humidity-proof sheath 18 to form a 2.7 mm. (8 French) catheter which can be inserted into and moved to the interior of a blood vessel to a selected portion of a patient's, man or animal, circulatory system. For instance, an incision can be made into an external jugular vein in a patient's neck. The transducers 12, 13 and the catheter can then be inserted into the incision and the transducers 12, 13 can be moved by hand and finger manipulations upon sheath 18 by means 20, such as by hand or finger manipulations up to and through a patient's heart to measure the blood velocity on both sides of the heart valve. Alternatively, the catheter can be inserted in an arm vein such as the brachial or a leg vein such as the femural.

Within the sheath 18, which may be silicon rubber or vinyl, a pair of cables 15 and 16 are connected respectively to crystals 12 and 13, cables 15, 16 being jacketed by insulating material 17.

Figure 2:
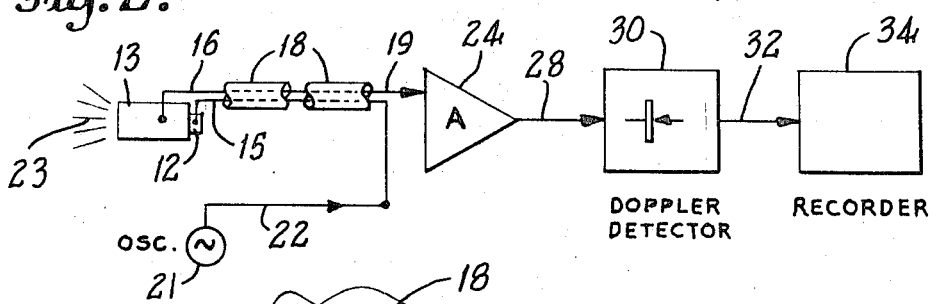
FIG. 2 is a block diagram of a velocity measuring system employing the catheter type probe of FIG. 1.

Cables 15 and 16 are connected to electronic equipment as shown in FIG. 2 external of the patient's body at the distal end of sheath 18 after it leaves the blood vessel incision at a convenient location such as the neck, arm or leg. As shown in FIG. 2, conductor 15 is connected to an oscillator 21 by a conductor 22. Preferably, oscillator 21 operates at an ultrasonic frequency, such as 4.5 mc. and the generated wave is radiated along the axis of 12 as ultrasonic waves 23. When the catheter is inserted in a blood vessel, the particulate matter in the blood reflects an ultrasonic frequency wave back towards crystal 13 which is excited to provide a received ultrasonic voltage upon cable 16. The distal end of cable 16 is connected or coupled to the input side of an amplifier 24 by a lead 19 which conducts not only the reflected signal on cable 16 but also the relatively much stronger signal on cable 15 coupled principally from crystal 12 to crystal 13. Amplifier 24 provides an output on lead 28 having both the transmitted signal and the reflected signal. The output 28 of amplifier 24 is connected to the input side of a Doppler detector 30 which measures the difference in frequency of the transmitted wave and the reflected wave and yields a voltage on output 32 of the Doppler detector 30 which is indicative of the velocity and direction of the blood stream in the vicinity of the probe containing crystals 12 and 13. Conveniently, the recorder 34 is connected to 32 for providing a record of the velocity of the blood at the probe locations as the probe is moved in the circulatory system by radiographic guidance.

Figure 3:
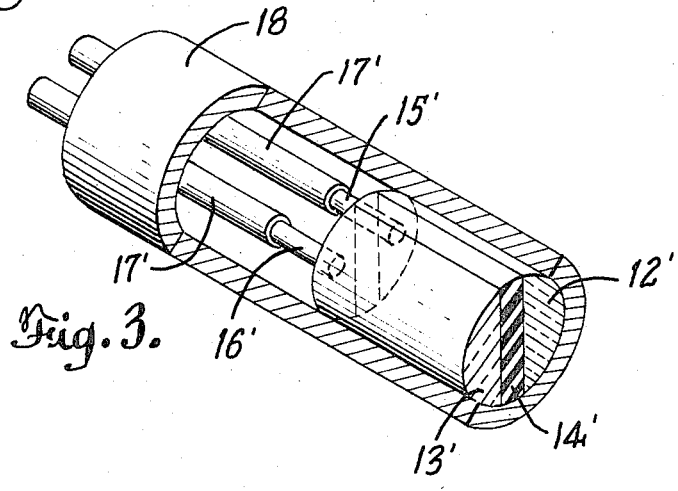
FIG. 3 is an elevation view, partly in cross section of an alternate embodiment for the catheter type probe of FIG. 1.

FIG. 3 illustrates an alternative arrangement of the pair of transducers 12 and 13 in a side by side arrangement of the crystals.

It is to be understood that the transducers in FIGS. 1 and 3, as well as the system shown in FIG. 2, can be utilized for measuring the flow of any liquid having particulate material, such as sea water in a conduit. My invention becomes particularly important when the measurement of flow velocity is required in a remote location in the conduit system which is not accessible. Under such circumstances, an opening is made at a convenient location in the conduit, a probe containing crystal transducers 12 and 13 is inserted in the conduit opening and the probe is then moved longitudinally along the conduit to the desired flow velocity measurement station. The probe consisting of crystal transducers 12, 13 and the connecting cables 15, 16 are dimensioned according to the diameter of the conduit or conduits and the frequency employed for oscillator 21.

As described, this invention discloses a unique catheter structure which permits insertion of the probe into a blood vessel at a remote convenient spot and then moved by simple manipulation of the probe, under radiographic guidance, to the desired location, thus avoiding the necessity of exposing the vessel and circumventing the trauma necessarily associated with such an exposure.

The measurement of blood flow in the cardiovascular system with a minimum of physiological insult to the system has long been an objective of physiological instrumentation design. The development of electromagnetic and pulsed ultrasonic flowmeters with lumen probes has permitted flow measurements in intact vessels, but it has still been necessary to expose the vessel near where the measurement is desired. This invention describes an ultrasonic flowmeter which is not pulsed, but rather depends on the Doppler principle.

Particulate suspensions, such as cells in blood, provide sufficient interface to back-scatter ultrasonic waves. Such reflections from radially moving particles experience a Doppler shift. The frequency spectrum of the back-scattering sound waves is both shifted and spread by the flow profile. Integration of scatter power over the frequency spectrum produces an output signal proportional to the instantaneous average flow velocity of the profile. Further integration over time produces a time average flow velocity. A spectrum analysis of the back-scattered signal provides a profile of the laminar or turbulent flow in the vessel with respect to velocity distribution.

The transmission characteristics of any media can be represented as a complex exponential.

$$\gamma = A\epsilon^{(\alpha+j\beta)}$$

where:

$\alpha$ represents the attenuation characteristics of the media
$\beta$ represents the delay or storage characteristics of the media
$A$ is a factor of proper proportionality The attenuation constant $\alpha$ has, in our case, several major factors which include the transmission coefficient of the media, the reflection coefficient of the particle, etc. The phase constant $\beta$, for our case, may be considered the pure phase delay of a sinusodial wave, measured in radians at the transmitted wave length.

A back-scattered wave $\Gamma_R$ then is the original wave $\Gamma_T$ multiplied by this transmission characteristic:

$$\Gamma_R = \Gamma_T \gamma = \Gamma_T A \epsilon^{(\alpha+j\beta)}$$

The path can thus be expressed in terms of phase delay over the transmission path. This delay is $$\beta = \frac{2\pi(a+b)}{\lambda_T}$$

where:

$a$ represents the transmission path length;
$b$ represents the return path length; and
$\lambda_T$ represents the transmitted wavelength.

Rearranging and differentiating:

$$\frac{d(a+b)}{dt} = \frac{\lambda_T}{2\pi} \times \frac{d\beta}{dt} = \lambda_T f \text{ meters/sec.}$$

The left-hand term represents the rate of change of the path length, while the right-hand term contains constants and one variable which is the Doppler frequency. The Doppler frequency $f$, is the frequency shift imposed on the source $\Gamma_T$ by the media. Assuming common transmitting and receiving sites, the path length becomes $2a$ and its differential becomes the radial velocity of the particle with respect to the source.

Thus:

$$V_R = \frac{\lambda}{2} f$$

where $V_R$ represents radial velocity.

The Doppler frequency $f$ is actually a phase-modulated signal and thus represents the usual Bessel function derived spectrum which occupies a band-width far greater than that of $f$ itself. A typical Doppler signal received by the flowmeter of FIG. 2 consists of, (a) a very strong carrier, which may be 4.5 mc., coupled principally from transmitting crystal to receiving crystal and (b) a very weak single Doppler side-band, spaced from a fraction of one c.p.s. to 15 kc. away from the carrier, which contains the flow information. It is desirable to retrieve this sideband in such a way as to preserve its identity as an upper or lower side-band since this identifies the direction of fluid flow.

Since a carrier with a single side-band is both phase and amplitude modulated, there is a choice of known detectors. For instance, since both carrier and side-band are mixed, simple diode detection produces the desired demodulation, but flow-direction information would be lost, as there would be no way of knowing whether the side-band was upper or lower without additional sensing circuitry. Also, turbulent flow, with negative directional components would not be correctly averaged in such system. A standard discriminator precisely tuned to the carrier, rejects the carrier, demodulates the side-band, and is satisfactory if adequate discriminator and carrier stabilities are provided. The ratio of required discriminator stablity to desired output accuracy is about the same as the ratio of carrier amplitude to side-band amplitude, and may be as much as one million to one. Also, a 12 c.p.s. wide 6 db notch filter can be inserted on the translated carrier but the accurate maintenence of the translated carrier frequency precisely in this notch is again difficult and such filter cost is relatively high. Low velocity components may be lost since the notch severely attenuates side-bands close to the carrier.

A detector which has particular advantage is described in copending U.S. patent application Ser. No. 504,006 filed Oct. 23, 1965, K Detector, in which the carrier and the Doppler side-band are separated in such a way that the carrier is easily rejected without losing flow direction information. Thus, the problem of sensing and measuring small audio Doppler signals in the presence of large carriers is solved by translating the carrier to DC and rejecting the DC by AC coupling.

Ultrasonic transmission through blood or saline takes place at $1.5 \times 10^6$ mm./sec. and is relatively independent of temperature. At 4.5 mc., a wave length is about 0.343 mm. and a cycle of Doppler shift represents a half wavelength of radial target motion. Hence, an 11 kc. maximum design capability of $f$ represents a flow velocity of 5840 wavelengths/sec., or 2000 mm./sec. max. The minimum flow velocity is dictated by the low frequency response of the audio circuitry which is controlled down to 100 c.p.s., or a minimum flow velocity of 50 wavelengths/sec. or 17 mm./sec. The least count is thus less than 1% of full scale.

This invention is not confined to the specific embodiment described herein, nor is it confined to physiological instrumentation as taught herein, but is equally applicable to other embodiments and other applications in oil field, chemical plant, oil refinery, oceanographic and countless other fields wherever flow velocity measurements must be made in media containing particulate suspensions.

While there has been described and pointed out the fundamental novel features of the invention as applied to preferred embodiments, it will be understood that various omissions and substitutions and changes in the form and details of the devices illustrated and its operation may be made by those skilled in the art, without departing from the spirit of the invention. It is the intention, therefore, to be limited only as indicated by the scope of the following claims.

I claim:

1. A flowmeter for measuring velocity of blood in a patient's circulatory system which comprises a catheter dimensioned to be insertable into a patient's blood vessel and moved through the interior thereof to a selected remote location in the blood circulatory system, a pair of juxtapositioned piezoelectric crystals disposed within said catheter, transmission means coupling an ultrasonic frequency alternating voltage to one of the transducers to radiate a wave therefrom and coupling back an alternating voltage from the other transducer as generated by the reception thereat of a reflected wave from said one of the transducers, and Doppler means coupled to said transmission means for measuring the difference between the frequency of the radiated wave from one of said transducers and the frequency of the reflected wave received by said other transducer, said transmission means including a pair of sterile insulated cables arrangeable from a location outside the patient's body, through a conveniently located incision in the blood vessel and through the interior of the blood vessel to the pair of juxtapositioned transducers, and wherein the pair of piezoelectronic crystals are cylinders concentrically spaced from each other.

2. A flowmeter according to claim 1 wherein the cable coupled to the radiated wave is connected to the inner concentric cylinder crystal and the other cable is connected to the outer concentric cylinder crystal.

3. A flowmeter for measuring velocity of blood in a patient's circulatory system which comprises a catheter dimensioned to be insertable into a patient's blood vessel and moved through the interior thereof to a selected remote location in the blood circulatory system, a pair of juxtapositioned piezoelectric crystals disposed within said catheter, transmission means coupling an ultrasonic frequency alternating voltage to one of the transducers to radiate a wave therefrom and coupling back an alternating voltage from the other transducer as generated by the reception thereat of a reflected wave from said one of the transducers, and Doppler means coupled to said transmission means for measuring the difference between the frequency of the radiated wave from one of said transducers and the frequency of the reflected wave received by said other transducer, said transmission means including a pair of sterile insulated cables arrangeable from a location outside the patient's body, through a conveniently located incision in the blood vessel and through the interior of the blood vessel to the pair of juxtapositioned transducers, and wherein said crystals are spaced side by side with their longitudinal axes arranged in a parallel relationship.

4. A flowmeter for measuring velocity of blood in a patient's circulatory system which comprises a pair of juxtapositioned piezoelectric ultrasonic crystals, a pair of insulated cables connected at one end to the pair of crystals, a sheath of sterile nonreactive material enveloping said crystals and said cables, said crystals, said cables and said sheath being dimensioned to be hand insertable into an incision in a patient's blood vessel and hand moved longitudinally therein to a selected remote location in the blood circulatory system, an ultrasonic transmitter coupled to the distal end of one of said cables and an ultrasonic Doppler detector coupled to the distal ends of both cables for measuring the difference of velocities between the outward transmitted wave from said one crystal and reflected wave received by said other crystal, and wherein said pair of crystals are cylinders concentrically spaced from each other.

5. A flowmeter according to claim 4 wherein the cable coupled to said transmitter is connected to the inner concentric cylinder crystal and the other cable is connected to the outer cylinder crystal.

6. A flowmeter for measuring velocity of blood in a patient's circulatory system which comprises a pair of juxtapositioned piezoelectric ultrasonic crystals, a pair of insulated cables connected at one end to the pair of crystals, a sheath of sterile nonreactive material enveloping said crystals and said cables, said crystals, said cables and said sheath being dimensioned to be hand insertable into an incision in a patient's blood vessel and hand moved longitudinally therein to a selected remote location in the blood circulatory system, an ultrasonic transmitter coupled to the distal end of one of said cables and an ultrasonic Doppler detector coupled to the distal ends of both cables for measuring the difference of velocities between the outward transmitted wave from said one crystal and reflected wave received by said other crystal, and wherein said crystals are spaced side by side with their longitudinal axes arranged in a parallel relationship.

References Cited

UNITED STATES PATENTS

| | | | |
|---|---|---|---|
| 2,733,597 | 2/1956 | Hardy | 73—69 X |
| 2,770,795 | 11/1956 | Peterson. | |
| 2,908,888 | 10/1959 | Kirkland | 73—181 X |
| 3,222,926 | 12/1965 | Carver | 73—181 X |
| 3,249,105 | 5/1966 | Polanyi | 128—2.05 |
| 3,273,447 | 9/1966 | Frank | 128—2.05 |
| 3,349,762 | 10/1967 | Kapany | 128—2.05 |

FOREIGN PATENTS

| | | |
|---|---|---|
| 776,526 | 6/1957 | Great Britain. |
| 925,541 | 5/1963 | Great Britain. |
| 1,232,113 | 4/1960 | France. |

OTHER REFERENCES

"Ultrasonic Flowmeters," by Herrick et al., IRE Transactions on Medical Electronics, 1959, pp. 195–197 relied on.

RICHARD C. QUEISSER, *Primary Examiner.*

E. D. GILHOOLY, *Assistant Examiner.*

U.S. Cl. X.R.

75—194